UNITED STATES PATENT OFFICE.

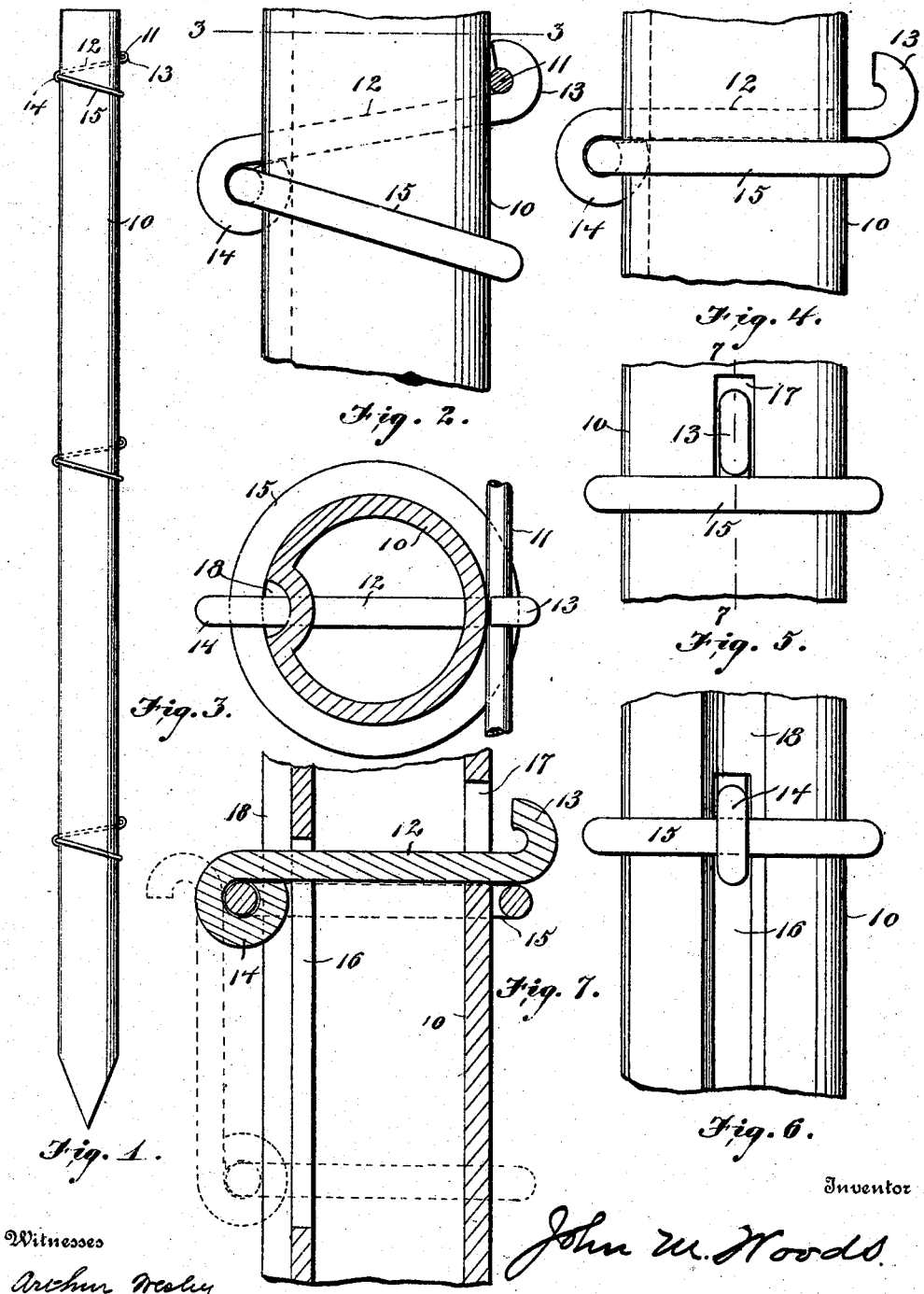

JOHN M. WOODS, OF LANES MILLS, PENNSYLVANIA.

FENCE-WIRE CLAMP.

No. 866,900.    Specification of Letters Patent.    Patented Sept. 24, 1907.

Application filed July 19, 1907. Serial No. 384,539.

*To all whom it may concern:*

Be it known that I, JOHN M. WOODS, a citizen of the United States, residing at Lanes Mills, in the county of Jefferson and State of Pennsylvania, have invented certain new and useful Improvements in Fence-Wire Clamps, of which the following is a specification.

This invention is a fence-wire clamp, and has for its object to provide a clamp of this kind by means of which the fence-wire can be securely fastened to the post, and also one which is simple in construction and which can be readily applied.

In the accompanying drawing Figure 1 is a side elevation of a post showing the application of the invention. Fig. 2 is an enlarged side elevation of one of the clamps in locking position. Fig. 3 is a horizontal section on the line 3—3 of Fig. 2. Fig. 4 is a side elevation of one of the clamps in released position. Figs. 5 and 6 are front and rear views, respectively, of the parts shown in Fig. 4. Fig. 7 is a longitudinal section on the line 7—7 of Fig. 5.

In the drawings 10 denotes a fence-post, preferably metal tubing such as a gas-pipe or the like. The base of the post is made pointed as shown so that it can be readily driven into the ground. The fence-wires are indicated at 11.

The clamp for the fence-wires comprises two members, one of which is a stem 12 which is formed at one of its ends into a hook 13, and at the other end into an eye 14. The other member of the clamp is a ring 15 which loosely encircles the post 10, and is connected to the hook member by means of the eye 14.

The post has on one side a series of longitudinal slots 16, and on the opposite side a series of holes 17 sufficiently large to permit the hook 13 to pass therethrough. There are as many of these holes and slots in the post as there are wires, and a clamp as herein described is provided for each wire. That side of the post containing the slots 16 is bent inwardly to form a longitudinal groove 18.

The clamp is applied as follows: The ring 15, with the hook member 12 attached thereto, is slipped over the post and brought into position in front of one of the slots 16 as shown by dotted lines in Fig. 7. The groove 18 receives that portion of the stem forming the eye 14 which is inside the ring in order that the parts may be slipped over the post as stated. The hook member is then passed through the slot 16 and through the hole 17 opposite the same so that the hook 13 will project from said hole, and the eye 14 from the slot. The ring 15 is brought close to the hook member and parallel thereto as shown in Figs. 4 to 7. With the clamp members in this position, the hook 13 projects a sufficient distance from the post 10 to permit the wire 11 to be placed thereinto. The ring is then pulled downwardly on the post which draws the hook inwardly toward the post thereby causing the hook to clamp the wire tightly to the post as shown in Figs. 1, 2 and 3. To release the wire it is necessary only to push the ring back to its first position, which forces the hook outwardly from the post sufficiently so that the wire can be readily disengaged therefrom.

The clamp herein described is simple in construction, and by its use the fence-wire can be quickly and securely clamped to the post.

I claim:

1. The combination with a fence-post having a transverse opening, of a stem extending loosely through said opening and projecting from opposite sides of the post, a hook on one end of the stem engageable with the fence-wire, and a ring loosely encircling the post and connected to the other end of the stem.

2. The combination with a tubular fence-post having on one side a slot and on the opposite side a hole, of a stem extending through said slot and said hole and projecting from opposite sides of the post, a hook on the end of the stem which projects from the hole, and engageable with the fence-wire, and a ring encircling the post and connected to the opposite end of the stem.

3. The combination with a tubular fence-post having on one side a longitudinally slotted groove, and a hole in the opposite side, of a stem extending through said slot and said hole, and projecting from opposite sides of the post, a hook on the end of the stem which projects from the hole, and engageable with the fence-wire, an eye on the opposite end of the stem, and a ring encircling the post and connected to the eye.

In testimony whereof I affix my signature, in presence of two witnesses.

JOHN M. WOODS.

Witnesses:
F. B. WEAVER,
J. P. TAYLOR.